United States Patent
Cho et al.

(10) Patent No.: US 8,756,596 B2
(45) Date of Patent: Jun. 17, 2014

(54) HOST APPARATUS CONNECTED TO IMAGE FORMING APPARATUS AND DRIVER INSTALLATION METHOD AND COMPUTER-READABLE MEDIUM THEREOF

(75) Inventors: Jae-kyung Cho, Suwon-si (KR); Seung-soo Oak, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 302 days.

(21) Appl. No.: 12/926,217

(22) Filed: Nov. 2, 2010

(65) Prior Publication Data

US 2011/0225581 A1   Sep. 15, 2011

(30) Foreign Application Priority Data

Mar. 15, 2010  (KR) .......................... 10-2010-0022817

(51) Int. Cl.
*G06F 9/44*   (2006.01)
(52) U.S. Cl.
USPC ............................ 717/178; 717/175; 717/176
(58) Field of Classification Search
None
See application file for complete search history.

(56) References Cited

U.S. PATENT DOCUMENTS

| | | |
|---|---|---|
| 6,607,314 B1 | 8/2003 | McCannon et al. |
| 6,959,437 B2 * | 10/2005 | Schacht et al. ................ 719/321 |
| 2003/0051011 A1 | 3/2003 | Schacht et al. |
| 2003/0065773 A1 | 4/2003 | Aiba et al. |
| 2004/0167973 A1 | 8/2004 | Shima et al. |
| 2007/0169101 A1 * | 7/2007 | Konersmann et al. ........ 717/170 |
| 2010/0005460 A1 * | 1/2010 | Aiba et al. .................... 717/173 |

OTHER PUBLICATIONS

European Search Report dated Nov. 8, 2011 issued in corresponding European Patent Application No. 10192432.2.

* cited by examiner

*Primary Examiner* — Lewis A Bullock, Jr.
*Assistant Examiner* — Mark Gooray
(74) *Attorney, Agent, or Firm* — Staas & Halsey LLP

(57) ABSTRACT

Disclosed are a host apparatus connected to an image forming apparatus and a driver installation method and computer-readable medium thereof. A driver installation method of a host apparatus includes accessing a web page provided by the web server and selecting an installation of at least one driver stored in the web server in the host apparatus, transmitting user information of the host apparatus to the driver download server by the host apparatus, determining by the driver download server an existence of a custom driver for a user of the host apparatus by using the user information; and installing in the host apparatus the at least one driver selected according to the existence of the custom driver. With this configuration, a host apparatus and a driver installation method enables a user to install a latest version of the custom driver without any complicated process if a user accesses a web server in the image forming apparatus and selects an installation of the at least one driver.

29 Claims, 3 Drawing Sheets

HOST APPARATUS CONNECTED TO IMAGE FORMING APPARATUS AND DRIVER INSTALLATION METHOD AND COMPUTER-READABLE MEDIUM THEREOF

CROSS-REFERENCE TO RELATED APPLICATIONS

This application claims priority from Korean Patent Application No. 10-2010-0022817, filed on Mar. 15, 2010 in the Korean Intellectual Property Office, the disclosure of which is incorporated herein by reference.

BACKGROUND

1. Field

Exemplary embodiments relate to a host apparatus connected to an image forming apparatus and a driver installation method and computer-readable medium thereof, and more particularly, to a host apparatus and a driver installation method and computer-readable thereof which provides a latest version of a custom driver.

2. Description of the Related Art

An image forming apparatus may form an image on paper. The image forming apparatus may include a printer, a photocopier, a facsimile, or a multi-function device having at least two functions.

A user generates print data by using a host apparatus such as a personal computer (PC) connected to an image forming apparatus, and the generated print data are transmitted to the image forming apparatus. The image forming apparatus performs a print operation based on the received print data.

In relation to the foregoing, a driver is installed in the host apparatus to support functions of the image forming apparatus.

Typically, the driver may be stored on a disk such as a compact disc (CD) provided by a vendor and included with a user's purchase of the image forming apparatus or in the alternative stored on a storage device such as a hard disk mounted in the image forming apparatus. Otherwise, the driver may be downloaded via the internet from the vendor's server through the host apparatus.

If the driver is provided as a storage device such as a CD or a hard disk, it may not be the latest version.

In such a case, a user may initially install the outdated provided driver and additionally download the latest version from the vendor's server.

However, in the case of a custom driver fit for a specific customer, the vendor may not easily provide different drivers on CDs or storage devices mounted in the image forming apparatus for each user.

If a user downloads the driver from the vendor's website, a user who is not familiar with the Internet or does not know exactly what to look for may find it difficult to search for a particular custom driver f fit or designed specially for the image forming apparatus and install the driver.

SUMMARY

Accordingly, one or more exemplary embodiments provide a host apparatus and a driver installation method thereof which automatically determines an existence of a custom driver for a user and downloads and installs the custom driver enabling a user to install the latest version of the custom driver without a complicated process if a user accesses a web server stored on the image forming apparatus and selects an installation of a driver.

The foregoing and/or other aspects may be achieved by providing a driver installation method of a host apparatus which is connected to an image forming apparatus including a web server storing therein at least one driver and connected to a driver download server, the method including: accessing a web page provided by the web server and selecting an installation of at least one driver stored in the web server in the host apparatus; transmitting user information of the host apparatus to the driver download server by the host apparatus; determining by the driver download server an existence of a custom driver for a user of the host apparatus by using the user information; and installing in the host apparatus the at least one driver selected according to the existence of the custom driver.

The method may further include determining by the host apparatus whether the custom driver is identical to the selected driver if the custom driver exists.

The installing in the host apparatus may include installing the selected driver if the custom driver is identical to the selected driver according to the existence of the custom driver.

The method may further include requesting the custom driver by the host apparatus; and downloading the requested custom driver if the custom driver is different from the selected driver according to the existence of the custom driver.

The installing in the host apparatus may include installing the downloaded custom driver.

The installing in the host apparatus may include installing the selected driver if the custom driver does not exist.

The determining the existence of the custom driver may include determining whether the selected driver is a latest version, and further include selectively receiving the latest version of the driver from the driver download server.

The method may further include selecting an installation of the at least one driver stored in the web server, which is the custom driver and the latest version of the driver according to the existence of the custom driver.

The method may further include receiving user information of the host apparatus, wherein the determining the existence of the custom driver may include using the input user information.

The determining the existence of the custom driver may include automatically collecting the user information of the host apparatus and using the collected user information.

The foregoing and/or other aspects may be achieved by providing a host apparatus which is connected to an image forming apparatus including a web server storing therein at least one driver and connected to a driver download server, the host apparatus including: a communication unit which is connected to the image forming apparatus and the driver download server; a display unit which displays thereon a web page including at least one driver stored in the web server; a user input unit which is used to select an installation in the host apparatus at least one driver stored in the web server from the displayed web page; and a controller which controls the communication unit to transmit user information of the host apparatus to the driver download server and receive information of an existence of a custom driver for a user of the host apparatus from the driver download server, and installs in the host apparatus the at least one selected driver including the custom driver according to the existence of the custom driver.

The controller may determine whether the custom driver is identical to the selected driver if the custom driver exists.

The controller may install the selected driver if the custom driver is identical to the selected driver according to the existence of the custom driver.

The controller may request the custom driver from the driver download server and control the communication unit to download the custom driver if the custom driver is different from the selected driver according to the existence of the custom driver.

The controller may install the downloaded custom driver.

The controller may install the selected driver if the custom driver does not exist.

The communication unit may selectively receive a latest version of the driver from the driver download server depending on whether the selected driver is the latest version.

The user input unit may be used to select an installation of the at least one driver stored in the web server, which is the custom driver and the latest version of the driver according to the existence of the custom driver.

The user input unit may receive user information of the host apparatus, and the controller may control the communication unit to transmit the input user information to the driver download server.

The controller may control the communication unit to automatically collect the user information of the host apparatus and to transmit the collected user information to the driver download server.

The foregoing and/or other aspects are achieved by providing a method, including requesting, by a computer, a customized driver for an apparatus from a download server, the requesting including transmitting user information from the computer to the apparatus, the computer, the apparatus and the download server connected to a network, transmitting the customized driver from the download server to the computer based on the user information; and installing the customized driver in the computer.

The foregoing and/or other aspects are achieved by providing an apparatus, including a request unit that requests a customized driver for an apparatus from a download server, the request unit transmitting user information from a computer to the apparatus, the computer, the apparatus and the download server connected to a network, a transmission unit that transmits the customized driver from the download server to the computer based on the user information, and an installation unit that installs the customized driver in the computer.

The foregoing and/or other aspects are achieved by providing at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
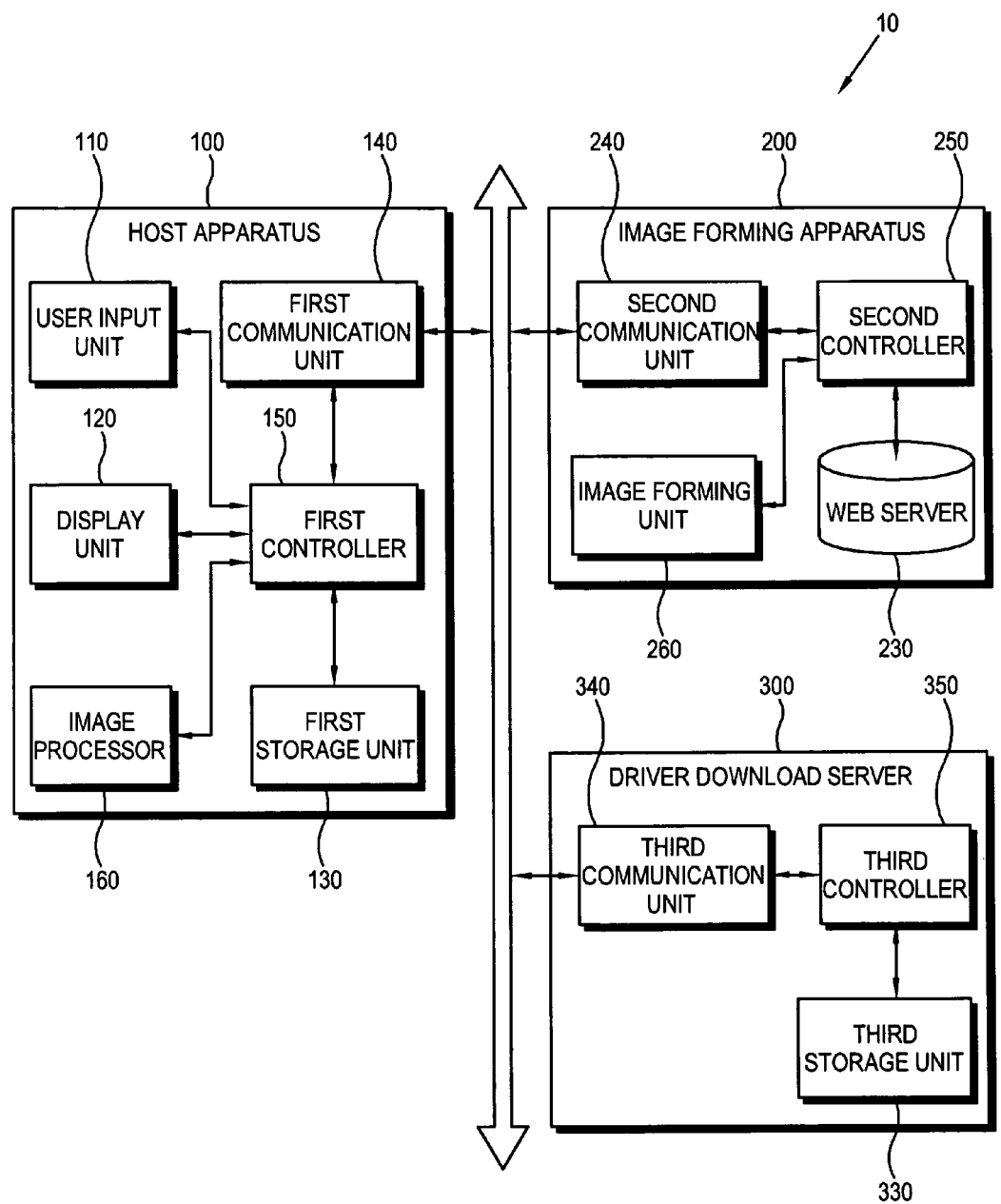
FIG. 1 is a block diagram of an image forming system according to example embodiments.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an image forming system 10 according to example embodiments.

As shown therein, the image forming system 10 according to example embodiments may include a host apparatus 100, an image forming apparatus 200 and a driver download server 300.

The host apparatus 100 may include a personal computer (PC). The image forming apparatus 200 may include a printer which includes an image forming unit 260 performing a print operation according to a print command and is connected to a network, a local connection, parallel connection or UNC (Universal Naming Convention) connection or may also include a multi-function device performing at least two functions.

The print operation includes a print operation to copy a scanned document, a print operation for received fax data, and a print operation for print data received from a network connection through the host apparatus 100 including a server or print data stored in an internal(hard disk drive) or external (USB memory stick) non-transitory computer-readable medium of the image forming apparatus 200.

A web server 230 is provided within the image forming apparatus 200 according to example embodiments and stores therein a print driver (hereinafter, to be also called "driver"). The image forming apparatus 200 may be shared on a network as a network image forming apparatus 200 having assigned its own IP address. The assigned IP address is set as a representative URL of the image forming apparatus 200. A user may access the web server 230 of the image forming apparatus 200 via the IP address.

The web server 230 of the image forming apparatus 200 may provide a download page as a web page providing links to download at least one of stored printer drivers.

Referring to FIG. 1, the image forming apparatus 200 may further include a second communication unit 240 to communicate with the host apparatus 100 and a second controller 250 to control an operation of the image forming apparatus 200.

As shown therein, the host apparatus 100 includes a user input unit 110, a display unit 120, a first storage unit 130, a first communication unit 140, a first controller 150 and an image processor 160.

The user input unit 110 receives various commands from a user.

More specifically, a user may execute a web browser through the user input unit 110, input the IP address of the image forming apparatus 200, access the web server 230 of the image forming apparatus 200, and select a driver to be installed in the host apparatus 100.

The user input unit 110 may include a keyboard or a mouse provided as input devices of the host apparatus 100, and may include a graphic user interface (hereinafter, to be also called "GUI") which is generated by an execution of a printer driver or an additional application and receives input from a user. The GUI according to example embodiments may include an icon, a button or a text input window to be selected by a user.

A user may perform a log-in process to a preinstalled printer driver or an application through the user input unit 110. The user input unit 110 receives user certification information from a user to perform the log-in process. The first controller 150 certifies a user through the input user certification information.

The display unit 120 includes a liquid crystal display (LCD) and a driver (not shown) to drive the LCD. The display unit 120 may display thereon a GUI relating to a print operation.

More specifically, the display unit 120 displays a web page, i.e., a driver download page provided by the web server 230 if a user executes the web browser through the user input unit 110 and accesses the web server 230 of the image forming apparatus 200.

The driver download page may be displayed for a user thereby allowing the user to select a driver to be installed in an image forming apparatus.

A user selects (e.g., double clicks) at least one of the displayed drivers through the user input unit 110 and selects an installation of the driver in the host apparatus 100.

A user may select immediate installation of the selected driver or an installation after storage of the driver. Further, a user may select a concurrent installation of a plurality of drivers.

If only one driver is stored in the web server 230, a user may select only the installation of the driver and need not select the type of the installed driver.

The first storage unit 130 stores therein print data generated according to a user's print operation. The first storage unit 130 of the host apparatus 100 according to example embodiments may further include user identification information.

The first storage unit 130 may include an internal or external storage module such as a hard disk drive (HDD) or a flash memory.

The first communication unit 140 communicates with the driver download server 300 and the image forming apparatus 200. The first communication unit 140 may include a wired/wireless communication module to be connected to an outside network having the driver download server 300 and the image forming apparatus 200 according to a predetermined protocol.

The first controller 150 controls the host apparatus 100 as a whole. The first controller 150 may include hardware such as a processor (CPU) incorporated with software or firmware.

The first controller 150 controls the image processor 160 to generate print data upon reception of a print command from a user.

The image processor 160 generates print data in a predetermined print language according to a print command through the user input unit 110. The image processor 160 may include a printer driver which generates print data in a predetermined print language.

The installation process of the printer driver according to example embodiments may be performed regardless of whether the driver is preinstalled in the host apparatus 100.

If a user executes the web browser through the user input unit 110 and inputs the IP address of the image forming apparatus 200, the first controller 150 controls the first communication unit 140 to access the web server 230 of the image forming apparatus 200.

The first controller 150 controls the first communication unit 140 to receive the driver download page stored in the web server 230 and controls the display unit 120 to display thereon the received driver download page.

If a user selects to download at least one driver from the displayed driver download page, the first controller 150 requests the image forming apparatus 200 to download the selected driver. A user may select at least one driver to be installed in the host apparatus 100 among a plurality of drivers stored in the web server 230.

The first controller 150 controls the first communication unit 140 to receive the driver, i.e., an installation file transmitted from the image forming apparatus 200 according to a user's selection.

Upon completion of the reception of the driver, the first controller 150 controls the first communication unit 140 to transmit user information of the host apparatus 100 to the driver download server 300 and determine the existence of the custom driver for a user.

The first controller 150 may control the display unit 120 to display thereon a GUI in order for a user to input user information (e.g., user ID) or control the first communication unit 140 to receive the user information corresponding to the displayed GUI and transmit the user information to the driver download server 300.

The first controller 150 may control the first communication unit to automatically collect user information stored in advance in the first storage unit 130 and transmit the user information to the driver download server 300.

The custom driver according to example embodiments includes a user-defined driver for a specific user and may be provided according to a user's request and stored in advance in the driver download server 300.

For example, if a user uses black monochromatic printing more than color printing, he/she may request a custom driver fit for the black monochromatic printing. If a user uses a scan function frequently, he/she may request a custom driver emphasizing the scan function from a vendor.

The vendor may store the custom driver as the user-defined driver fit or designed for a specific user in the driver download server 300, and a user may access the driver download server 300 to download and install the custom driver.

In the event that the custom driver exists, upon reception of information of the custom driver from the driver download server 300, the first controller 150 receives the information through the first communication unit 140, and determines whether the driver downloaded from the image forming apparatus 200 is identical to the custom driver.

The determination of whether the driver downloaded is identical to the custom driver includes checking the version as well as the type of the driver.

That is, the first communication unit 140 may transmit version information of the driver downloaded from the image forming apparatus 200 together with the user information to the driver download server 300 and determine whether there is a later version of the driver.

If it is determined that the driver downloaded from the image forming apparatus 200 is identical to the custom driver stored in the driver download server 300, the first controller 150 installs in the host apparatus 100 the driver downloaded in advance from the image forming apparatus 200.

If it is determined that the driver downloaded from the image forming apparatus 200 is different from the custom driver stored in the driver download server 300, the first controller 150 controls the first communication unit 140 to request and receive the custom driver from the driver download server 300 and installs the received custom driver in the host apparatus 100.

The driver download server 300 is a server managed by a vendor of the image forming apparatus 200. As in FIG. 1, the driver download server 300 includes a third storage unit 330 to store therein installation files of printer drivers provided by a vendor, a third communication unit 340 to communicate with the host apparatus 100 and a third controller 350 to control the driver download server 300 as a whole.

The driver which is stored in the third storage unit 330 includes a custom driver fit or designed for a specific user and which is the latest version of the driver.

If user information is received from the host apparatus 100 through the third communication unit 340, the third controller 350 determines whether there is a custom driver corresponding to the received user information among the drivers stored in the third storage unit 330, and transmits the determination result to the host apparatus 100 through the third communication unit 340.

If the information of the driver stored or installed in advance in the host apparatus 100 is received together with the user information, the third controller 350 may determine whether there is any latest version of the driver in the third storage unit 330 and further transmit the result to the host apparatus 100 through the third communication unit 340.

If the host apparatus 100 requests the custom driver (including the latest version of the driver), the third controller 350 controls the third communication unit 340 to transmit the custom driver for a user of the host apparatus 100 to the host apparatus 100.

If a user carries out selecting the installation of the driver through the web browser, the host apparatus 100 according to example embodiments determines the existence of the custom driver through the communication with the driver download server 300, and automatically downloads the latest version of the driver fit or designed for a user to thereby enhance user's convenience and raise user satisfaction by use of the driver.

Hereinafter, a driver installation process of the image forming system 10 with the foregoing configuration will be described with reference to FIGS. 2A and 2B.

Figure 2A:
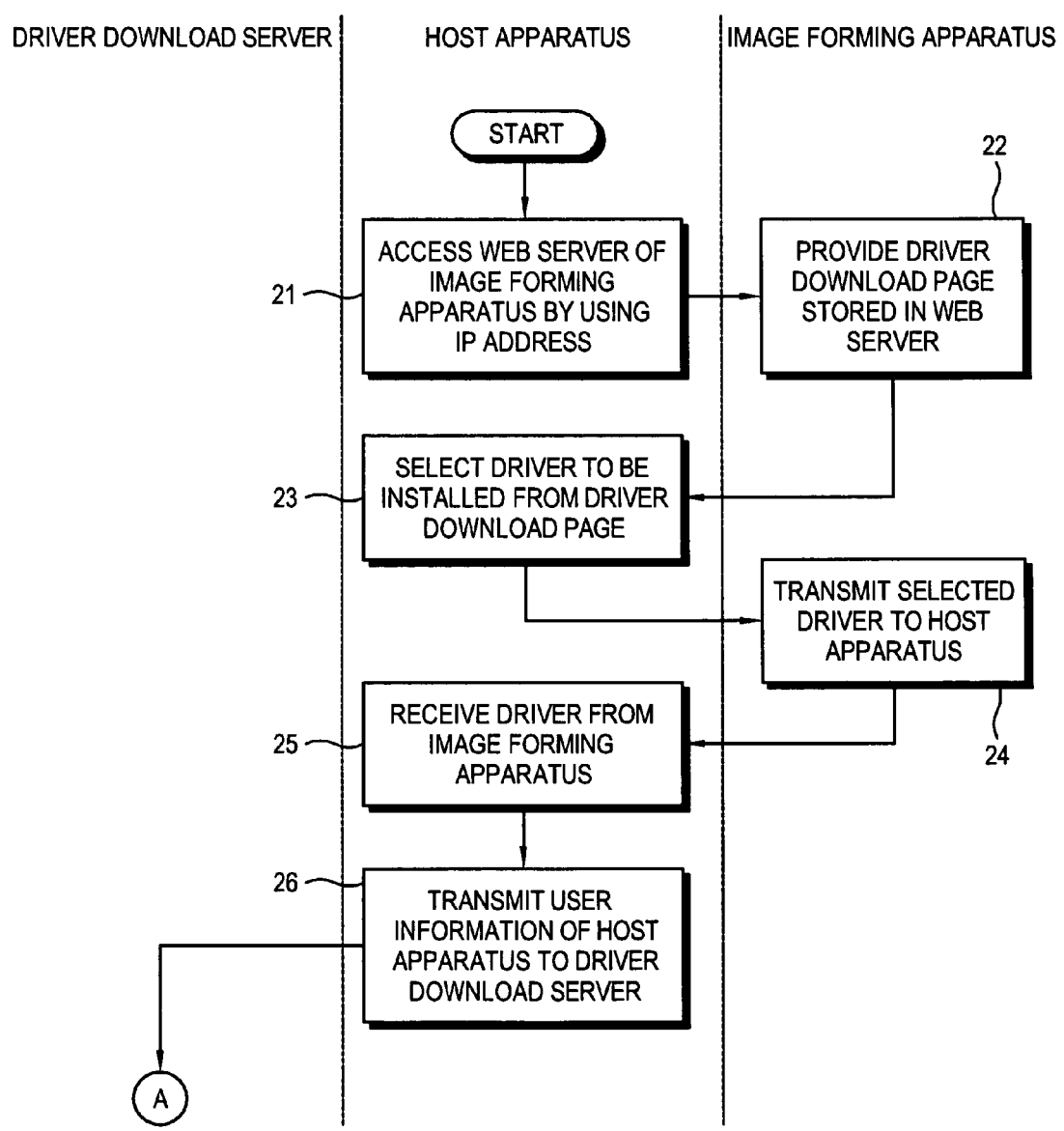
FIGS. 2A and 2B are flowcharts of a driver installation process of a host apparatus according to example embodiments.
Figure 2B:
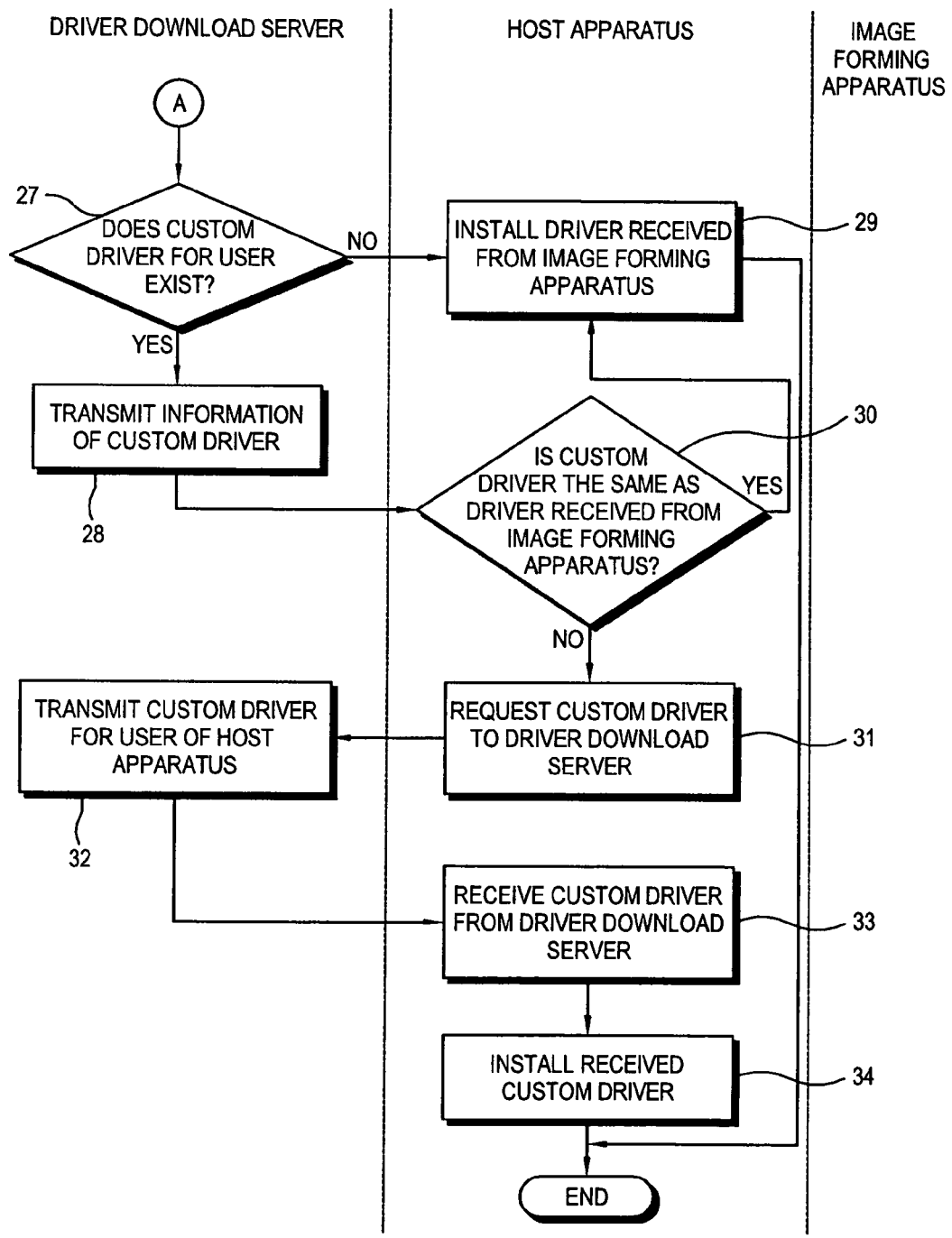

FIGS. 2A and 2B are flowcharts of a driver installation process according to example embodiments.

As shown in FIG. 2A, a user may execute the web browser from the host apparatus 100 and access the web server 230 of the image forming apparatus 200 through the IP address assigned to the image forming apparatus 200 (21).

The image forming apparatus 200 provides the driver download page stored in the web server 230 corresponding to the access request (22). The host apparatus 100 displays on the display unit 120 the driver download page as a web page provided by the web server 230.

A user selects the driver to be installed from the driver download page displayed on the display unit 120 of the host apparatus 100 (23). A user may select only the installation of a specific driver from the web page. The host apparatus 100 requests the selected driver to be transmitted from the image forming apparatus 200.

The image forming apparatus 200 transmits the driver selected at operation 23 to the host apparatus 100 corresponding to the transmission request (24).

The host apparatus 100 receives the driver transmitted at operation 24 from the image forming apparatus 200 (25). The operation 25 may include an operation of installing the received driver in the host apparatus 100 according to the user's selection such as the instantaneous installation or the installation after storage.

If the reception of the driver at operation 25 is completed, the host apparatus 100 transmits the user information to the driver download server 300 (26). The user information may include information input through the GUI displayed on the display unit 120 or information automatically collected by the host apparatus 100. At operation 26, the host apparatus may transmit the driver information received at operation 25 to the driver download server 300 together with the user information.

The driver download server 300 determines whether the custom driver exists for a user of the host apparatus 100 by using the user information received at operation 26 (27). If the driver information is transmitted together with the user information at operation 26, the driver download server 300 may further determine whether the latest version of the driver exists.

If it is determined at operation 27 that the custom driver exists, the driver download server 300 transmits the information of the custom driver to the host apparatus 100 (28). If the driver information is transmitted together with the user information at operation 26 and if it is determined that the latest version of the driver exists, the driver download server 300 may transmit the latest version of the driver to the host apparatus 100.

If it is determined at operation 27 that the custom driver does not exist, the host apparatus 100 installs the driver received at operation 25. If the driver information is transmitted together with the user information at operation 26, the host apparatus 100 installs the driver received at operation 25 if it is determined that the latest version of the driver does not exist.

The host apparatus 100 determines whether the custom driver stored in the driver download server 300 is identical to the driver received from the image forming apparatus 200 by using the information received at operation 28 (30). This is determined by checking the version as well as the type of the driver.

If the custom driver is identical to the driver received from the image forming apparatus 200, the host apparatus 100 installs the driver received at operation 25 (29).

If the custom driver is different from the driver received from the image forming apparatus 200, the host apparatus 100 requests the custom driver from the driver download server 300 (31). The host apparatus 100 may request a later version of the driver received at operation 25 to the driver download server 300.

The driver download server 300 responds to the request at operation 31 and transmits the custom driver for a user of the host apparatus 100 to the host apparatus 100 (32). The transmitted driver may include the latest version of the driver.

The host apparatus 100 receives the custom driver transmitted at operation 32 (33).

The custom driver received at operation 33 is installed (34).

The driver installed at operations 29 and 34 is the latest version while the driver installed at operation 34 is the user-defined driver fit for a user of the host apparatus 100.

The driver installation process according to example embodiments is applicable to various applications installed in the host apparatus 100 as well as the printer driver.

As described above, a host apparatus and a driver installation method thereof according to example embodiments automatically determines whether a custom driver exists for a user in a driver download server, downloads and installs the custom driver and enables a user to install the latest version of the custom driver without any complicated process if a user accesses a web server in the image forming apparatus and selects an installation of the driver.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A driver installation method of a host apparatus which is connected to an image forming apparatus comprising a web server storing therein at least one driver and connected to a driver download server, the method comprising:
    accessing a web page provided by the web server and selecting at least one driver stored in the web server in the host apparatus to be installed, and storing the at least one driver on the host apparatus without installing;
    in response to storing the at least one driver, transmitting user information of the host apparatus to the driver download server by the host apparatus;
    determining by the driver download server an existence of a custom driver for a user of the host apparatus by using the user information; and
    installing in the host apparatus one of the at least one driver selected and the custom driver according to the existence of the custom driver,
    wherein the custom driver is downloaded if the custom driver is to be installed.

2. The method according to claim 1, further comprising determining by the host apparatus whether the custom driver is identical to the selected driver if the custom driver exists.

3. The method according to claim 2, wherein the installing in the host apparatus comprises installing the selected driver if the custom driver is identical to the selected driver according to the existence of the custom driver.

4. The method according to claim 2, further comprising requesting the custom driver by the host apparatus; and
    downloading the requested custom driver if the custom driver is different from the selected driver according to the existence of the custom driver.

5. The method according to claim 4, wherein the installing in the host apparatus comprises installing the downloaded custom driver.

6. The method according to claim 1, wherein the installing in the host apparatus comprises installing the selected driver if the custom driver does not exist.

7. The method according to claim 1, wherein the determining the existence of the custom driver comprises determining whether the selected driver is a latest version, and further comprising selectively receiving the latest version of the driver from the driver download server.

8. The method according to claim 7, further comprising selecting an installation of one of the drivers stored in the web server which is the custom driver and the latest version of the driver according to the existence of the custom driver.

9. The method according to claim 1, further comprising receiving user information of the host apparatus, wherein
    the determining the existence of the custom driver comprises using the input user information.

10. The method according to claim 1, wherein the determining the existence of the custom driver comprises automatically collecting the user information of the host apparatus and using the collected user information.

11. A host apparatus which is connected to an image forming apparatus comprising a web server storing therein at least one driver and connected to a driver download server, the host apparatus comprising:
    a communication unit which is connected to the image forming apparatus and the driver download server;
    a display unit which displays thereon a web page comprising at least one driver stored in the web server;
    a user input unit which is used to select in the host apparatus at least one of the drivers stored in the web server to be installed from the displayed web page, and stores the at least one driver selected on the host apparatus without installing the at least one driver; and
    a controller which controls the communication unit, in response to storing the at least one driver, to transmit user information of the host apparatus to the driver download server and receive information of an existence of a custom driver for a user of the host apparatus from the driver download server, and installs in the host apparatus one of the at least one selected driver and the custom driver according to the existence of the custom driver,
    wherein the custom driver is downloaded if the custom driver is to be installed.

12. The host apparatus according to claim 11, wherein the controller determines whether the custom driver is identical to the selected driver if the custom driver exists.

13. The host apparatus according to claim 12, wherein the controller installs the selected driver if the custom driver is identical to the selected driver according to the existence of the custom driver.

14. The host apparatus according to claim 12, wherein the controller requests the custom driver from the driver download server and controls the communication unit to download the custom driver if the custom driver is different from the selected driver according to the existence of the custom driver.

15. The host apparatus according to claim 14, wherein the controller installs the downloaded custom driver.

16. The host apparatus according to claim 11, wherein the controller installs the selected driver if the custom driver does not exist.

17. The host apparatus according to claim 11, wherein the communication unit selectively receives a latest version of the driver from the driver download server depending on whether the selected driver is the latest version.

18. The host apparatus according to claim 17, wherein the user input unit is used to select an installation of the at least one driver stored in the web server, which is the custom driver and the latest version of the driver according to the existence of the custom driver.

19. The host apparatus according to claim 11, wherein the user input unit receives the user information of the host apparatus, and the controller controls the communication unit to transmit the input user information to the driver download server.

20. The host apparatus according to claim 11, wherein the controller controls the communication unit to automatically collect the user information of the host apparatus and to transmit the collected user information to the driver download server.

21. At least one non-transitory computer readable medium comprising computer readable instructions that control at least one processor configured to:
   access a web page provided by the web server and select at least one driver stored in the web server in the host apparatus to be installed, and store the at least one driver on the host apparatus without installing;
   in response to storing the at least one driver, transmit user information of the host apparatus to the driver download serve by the host apparatus;
   determine by the driver download server an existence of a custom driver for a user of the host apparatus by using the user information; and
   install in the host apparatus one of the at least one drive selected and the custom driver according to the existence of the custom driver,
   wherein the custom driver is downloaded if the custom driver is to be installed.

22. A method, comprising:
   storing, on a computer, a generic driver for an apparatus which is accessible from the apparatus and stored on the apparatus by downloading the generic driver from the apparatus, without installing the generic driver;
   in response to storing of the generic driver, requesting, by the computer, a customized driver for the apparatus from a download server, the requesting including transmitting user information from the computer to the download server, the computer, the apparatus and the download server connected to a network;
   transmitting the customized driver from the download server to the computer based on the user information; and
   installing one of the customized driver and the generic driver in the computer,
   wherein the custom driver is downloaded if the custom driver is to be installed.

23. The method of claim 22, wherein the request is made by a user from a user input received by a web-based interface displayed on a display of the computer, the web-based interface hosted by a web server stored in the apparatus.

24. The method of claim 23, wherein information related to at least one driver is displayed on the web-based interface on the display.

25. The method of claim 24, wherein the customized driver is specifically designed and customized to operate the apparatus according to specifications provided by the user.

26. The method of claim 25, wherein the user information includes information automatically collected from the computer.

27. The method of claim 26, wherein the customized driver transmitted to the computer is a latest version of the customized driver.

28. At least one non-transitory computer readable medium comprising computer readable instructions that control at least one processor to implement a method, comprising:
   downloading a generic driver from an apparatus without installing the generic driver;
   in response to downloading the generic driver, requesting a customized driver for an apparatus from a download server, the requesting including transmitting user information from a computer to the apparatus, the computer, the apparatus and the download server connected to a network;
   transmitting the customized driver from the download server to the computer based on the user information according to the existence of the custom driver;
   installing the customized driver in the computer if the custom driver s downloaded and
   installing the generic driver in the computer if the custom driver does not downloaded.

29. An apparatus, comprising:
   at least one processor;
   a storage unit to download and store on a computer a generic driver acquired from a second apparatus without installing the generic driver;
   a request unit that, in response to storing the generic driver, requests a customized driver for the second apparatus from a download server, the request unit transmitting user information from the computer to the download server, the computer, the second apparatus and the download server connected to a network;
   a transmission unit that transmits the customized driver from the download server to the computer based on the user information; and
   an installation unit that installs the customized driver in the computer if the transmission unit transmits the custom driver and installs the generic driver in the computer if the transmission unit does not transmit the custom driver.

* * * * *

UNITED STATES PATENT AND TRADEMARK OFFICE
CERTIFICATE OF CORRECTION

PATENT NO. : 8,756,596 B2  Page 1 of 1
APPLICATION NO. : 12/926217
DATED : June 17, 2014
INVENTOR(S) : Jae-kyung Cho et al.

It is certified that error appears in the above-identified patent and that said Letters Patent is hereby corrected as shown below:

In the Claims

Column 11, Line 19, In Claim 21, delete "serve" and insert -- server --, therefor.
Column 11, Line 23, In Claim 21, delete "drive" and insert -- driver --, therefor.
Column 12, Line 27, In Claim 28, delete "s downloaded" and insert -- is downloaded, --, therefor.

Signed and Sealed this
Twenty-third Day of September, 2014

Michelle K. Lee
*Deputy Director of the United States Patent and Trademark Office*